United States Patent Office 2,968,561
Patented Jan. 17, 1961

2,968,561

METHOD OF MANUFACTURING AN EDIBLE FOOD CONTAINER

Cecil H. Birnkrant, Beverly Hills, Calif., assignor to Birnkrant Frozen Confection Co., Los Angeles, Calif., a limited partnership No Drawing. Continuation of application Ser. No. 225,670, May 10, 1951. This application June 2, 1955, Ser. No. 512,870

13 Claims. (Cl. 99—89)

This is a continuation of my application for patent, Serial No. 225,670, filed May 10, 1951, now abandoned.

This invention relates to food containers and is more particularly concerned with edible containers, such as for ice cream, frozen custards, sherbets and similar ices or foods.

One of the objects of the invention is the provision of a container of the type mentioned which is structurally strong and of superior quality in comparison with ordinary types of edible containers, such as cake cones and cups, commonly used for ice cream, frozen custard and the like.

Another object is to provide such a container which can be filled with ice cream or custard in a fluid condition just prior to freezing without wilting or becoming soggy, then frozen and maintained in the frozen condition and without wilting or becoming soggy from any thawing of the filling during consumption thereof.

A further object is the provision of such containers which are not adversely affected by variations in temperature and humidity normally encountered and which are stable at deep freezing temperatures as well as at room temperatures.

A still further object is the provision of such a container which has a real or natural chocolate flavor but which does not become sticky in the hand.

A still further object is the provision of such containers which are very low in fat content and which have long shelf life and high stability against rancidity.

A still further object is a method of rapidly manufacturing such containers in multiple quantities and with a minimum of operations.

A still further object is the provision of a container of the type mentioned and a method of making it having flavors other than chocolate.

Other objects include the manufacturing of such containers in an assembly line operation and in which the baking of the dough or batter is effected without the mold used to form it.

Prior to this invention, edible ice cream containers, for example, were made exclusively from a wet type batter. This type batter is not suitable for incorporating cocoa and similar ingredients to form a chocolate tasting or appearing quality item when baked. This accomplishment has long been sought, but never heretofore attained. Prior attempts have all resulted in failures as to providing a real or natural chocolate flavor and appearance.

Heretofore, ice cream containers were made impervious to moisture by one of two methods, namely (1) spraying the container with a water repellent substance or (2) by crushing the container or a like cereal made substance in the nature of a panified product, including farinaceous or cereal matter, into a fine powder to which was added a moisture resistant ingredient, such as cocoa butter or some other oleaginous substance, followed by a reforming operation. The present invention obviates such costly and needless operations. After the original mixing of the batter and baking it in the desired shape, the final product of the present invention is already very highly impervious to moisture and will stand up without breaking down or becoming soggy under thawing ices.

Heretofore, most edible ice cream containers were regarded as being not particularly palatable. The containers of the present invention, however, are actually chocolate cake of a special and unusual kind which, when combined with ice cream or the like, and placed under refrigeration for hardening takes on a particularly palatable confectionery taste.

In general, the method of providing the containers of this invention comprises forming at room temperature a dry-like mealy or crumb type batter that is plastic and mold flowable at elevated temperatures, that is, the particles or crumbs combine into a continuous mass. The batter is placed in a pressure mold which is heated to the flow temperature of the batter. The mold is then upset and the formed batter removed to a conveyor, such as a traveling belt, and, in the naked condition, is passed into or through an oven and baked. It may be seen, therefore, that the molds are used only for a short time during the actual forming operation, which usually takes only a second or a fraction of a second or so and need not be tied up with the subsequent final baking operation.

It may be seen, also, that the success of the invention depends in a large measure upon the making of a batter having the proper physical properties. Otherwise, it would not be possible to form the batter in the mold and release it therefrom prior to final baking.

I have found that a suitable batter for the purpose should contain the following ingredients or their equivalents in the approximate relative quantities indicated:

| | |
|---|---|
| Wheat or pastry flour | 1 pound. |
| Powdered milk, whole or skim, but preferably skim | 4 level tablespoons. |
| Cocoa | ¼ pound. |
| Sugar | 1 pound. |
| Eggs (whole or equivalent reconstituted dried eggs) | 2⅔ to 2¾. |

Any of the usual coloring, flavoring and leavening agents may be added.

The batter is prepared in the form of a mealy or crumb consistency.

The following will illustrates, by example, the invention and the manner in which it may be practiced:

*Example*

A dry mix is prepared of 1 pound sifted pastry flour, ¼ pound cocoa, 4 level tablespoons powdered skim milk, 1 light level teaspoon cream of tartar and 1 light level teaspoon baking soda. A wet mix is then prepared of 1 pound sugar, 2⅔ whole fresh eggs, 2 ounces unsweetened baking chocolate, 1 tablespoon vanilla extract and 1 light teaspoon salt. The eggs are first beaten and the sugar slowly added thereto with constant stirring. The salt, vanilla extract and chocolate in melted form is then added with continued stirring. The previously prepared dry mix is then added slowly to the wet mix with continued stirring. The resulting batter will have a dry-like mealy or crumb consistency. The batter is placed in heated pressure molds and formed into desired shapes of containers or other articles. Using mold forms to provide a product having wall thicknesses of about $\frac{1}{32}$ to ⅛ inch, the temperature of the mold should be in the range of about 225° to 235° F., preferably about 230° F. At this temperature, the particles of the batter flow together into a continuous mass, assume the form of the forming mold and may then be removed from the mold without substantial deformation. It is then baked in the naked condition in an oven. The baking time is approximately 4 minutes at about 350° to 375° F.

In accordance with another embodiment of this invention, soy bean flour is substituted for the cocoa, substantially measure for measure. Soy bean flour and cocoa both have a substantial fat content. Accordingly, by substituting soy bean flour for cocoa, the chocolate flavor is eliminated and there can then be added to the batter any flavoring agent such as vanilla, strawberry, pineapple, grape, raspberry, lemon, orange etc. Hence an entire and complete series of flavors can, in accordance with this invention, be made and the invention is not limited to any specific flavor.

Having thus described my invention, I claim:

1. The method of manufacturing an edible container comprising forming a batter of raw unbaked ingredients having a mealy consistency and being flowable under heat and pressure, placing the batter in a hot pressure mold to cause the batter to flow and assume the shape of the mold, promptly removing the formed batter from the mold prior to baking and baking it in the naked state.

2. The method of manufacturing an edible container comprising forming a batter of raw unbaked ingredients comprising wheat flour, milk, eggs, sugar and a member selected from the group consisting of cocoa and soy bean flour, in proportions to provide a mealy consistency, placing the batter in a hot pressure mold to cause the batter to flow and assume the shape of the mold, promptly removing the formed batter from the mold and baking it in the naked state.

3. The method of manufacturing an edible container comprising forming a batter of raw unbaked ingredients comprising wheat flour, milk, cocoa, eggs and sugar, in proportions to provide a mealy consistency, placing the batter in a hot pressure mold to cause the batter to flow and assume the shape of the mold, promptly removing the formed batter from the mold and baking it in the naked state.

4. The method of manufacturing an edible container comprising forming a batter of raw unbaked ingredients comprising wheat flour, milk, soy bean flour, eggs and sugar, in proportions to provide a mealy consistency, placing the batter in a hot pressure mold to cause the batter to flow and assume the shape of the mold, promptly removing the formed batter from the mold and making it in the naked state.

5. The method as defined by claim 1 in which the batter in the mold is formed to a thickness in the range of about $\frac{1}{32}$ to $\frac{1}{8}$ inch and the temperature of the mold is in the range of about 225° to 235° F.

6. The method as defined by claim 1 in which the batter comprises essentially a mixture of 1 part wheat flour, $\frac{1}{8}$ part milk solids, $\frac{9}{40}$ part eggs, 1 part sugar, and $\frac{1}{4}$ part of a member selected from the group consisting of cocoa and soy bean flour.

7. The method of manufacturing a frozen food confection comprising forming into the shape of a container a mealy batter of wheat flour, milk, eggs, sugar and a member from the group consisting of cocoa and soy bean flour, by placing the batter in a hot pressure mold to cause the batter to flow and assume the shape of the mold, removing the formed container from the mold and baking it in the naked state, filling the container with a fluid ice and then freezing the ice in the container.

8. A method of manufacturing a frozen food confection comprising forming into the shape of a container a mealy batter of wheat flour, milk, cocoa, eggs and sugar, by placing the batter in a hot pressure mold to cause the batter to flow and assume the shape of the mold, removing the formed container from the mold and baking it in the naked state, filling the container with a fluid ice and then freezing the ice in the container.

9. A method of manufacturing a frozen food confection comprising forming into the shape of a container a mealy batter of wheat flour, milk, soy bean flour, eggs and sugar, by placing the batter in a hot pressure mold to cause the batter to flow and assume the shape of the mold, removing the formed container from the mold and baking it in the naked state, filling the container with a fluid ice and then freezing the ice in the container.

10. The method of manufacturing an edible container comprising preparing a dry mix of wheat flour, milk, and a member selected from the group consisting of cocoa and soy bean flour, preparing a separate wet mix of sugar, eggs and flavoring, combining the wet mix and the dry mix in proportions to provide a batter having a mealy consistency, placing the resulting batter in a hot pressure mold to cause the batter to flow and assume the shape of the mold, removing the formed batter from the mold and baking it in the naked state.

11. The method as defined by claim 10 in which the essential ingredients of the batter comprise approximately 1 part wheat flour, $\frac{1}{8}$ part milk solids, $\frac{9}{40}$ part eggs, 1 part sugar and $\frac{1}{4}$ part of the selected member, all by weight.

12. The method of manufacturing an edible container comprising preparing a dry mix of wheat flour, cocoa and milk, preparing a separate wet mix of sugar, eggs and flavoring, combining the wet mix and dry mix in proportions to provide a batter having a mealy consistency, placing the resulting batter in a hot pressure mold to cause the batter to flow and assume the shape of the mold, removing the formed batter from the mold and baking it in the naked state.

13. The method of manufacturing an edible container comprising preparing a dry mix of wheat flour, soy bean and milk, preparing a separate wet mix of sugar, eggs and flavoring, combining the wet mix and dry mix in proportions to provide a batter having a mealy consistency, placing the resulting batter in a hot pressure mold to cause the batter to flow and assume the shape of the mold, removing the formed batter from the mold and baking it in the naked state.

References Cited in the file of this patent

UNITED STATES PATENTS

| | | |
|---|---|---|
| 1,615,680 | Buhse | Jan. 25, 1927 |
| 2,077,595 | Swiss | Apr. 20, 1937 |
| 2,255,506 | Frediani | Sept. 9, 1941 |
| 2,394,791 | Lloyd | Feb. 12, 1946 |

OTHER REFERENCES

"Good Food and How To Cook It," by Newill, D. Appleton-Century Co., Inc., New York, 1939, pp. 327, 353 and 354.

"Everybody's Cookbook," Lord, revised edition, Harcourt Brace and Co., New York, page 46.